(12) United States Patent
Sato et al.

(10) Patent No.: US 11,307,370 B2
(45) Date of Patent: Apr. 19, 2022

(54) OPTICAL FIBER UNIT AND OPTICAL FIBER CABLE

(71) Applicant: SUMITOMO ELECTRIC INDUSTRIES, LTD., Osaka (JP)

(72) Inventors: Fumiaki Sato, Osaka (JP); Kuushin Ryan, Osaka (JP); Yoshiaki Nagao, Osaka (JP)

(73) Assignee: SUMITOMO ELECTRIC INDUSTRIES, LTD., Osaka (JP)

( * ) Notice: Subject to any disclaimer, the term of this patent is extended or adjusted under 35 U.S.C. 154(b) by 0 days.

(21) Appl. No.: 16/759,760

(22) PCT Filed: Nov. 2, 2018

(86) PCT No.: PCT/JP2018/040847
§ 371 (c)(1),
(2) Date: Apr. 28, 2020

(87) PCT Pub. No.: WO2019/088255
PCT Pub. Date: May 9, 2019

(65) Prior Publication Data
US 2021/0181440 A1    Jun. 17, 2021

(30) Foreign Application Priority Data
Nov. 2, 2017    (JP) .............................. JP2017-212768

(51) Int. Cl.
*G02B 6/44*    (2006.01)
(52) U.S. Cl.
CPC ................................. *G02B 6/4403* (2013.01)
(58) Field of Classification Search
CPC ................................ G02B 6/4403; G02B 6/44
USPC ......................................................... 385/114
See application file for complete search history.

(56) References Cited

U.S. PATENT DOCUMENTS

| | | | | |
|---|---|---|---|---|
| 4,523,086 A | * | 6/1985 | Eilentropp | H05B 3/58 |
| | | | | 219/549 |
| 4,846,566 A | * | 7/1989 | Barnett | G02B 6/4403 |
| | | | | 385/109 |
| 4,906,067 A | | 3/1990 | Mayr et al. | |
| 5,071,221 A | * | 12/1991 | Fujitani | G02B 6/4494 |
| | | | | 385/100 |

(Continued)

FOREIGN PATENT DOCUMENTS

| | | | |
|---|---|---|---|
| JP | 08240752 A | * | 9/1996 |
| JP | 2000098200 A | * | 4/2000 |

(Continued)

OTHER PUBLICATIONS

Tanji et al., "Optical fiber cabling technologies for flexible access network," Optical Fiber Technology, vol. 14, No. 3, Jul. 1, 2008 (Jul. 1, 2008), pp. 177-184.

*Primary Examiner* — Kaveh C Kianni
(74) *Attorney, Agent, or Firm* — Faegre Drinker Biddle & Reath LLP

(57) ABSTRACT

An optical fiber unit includes: an assembly in which a plurality of optical fiber ribbons in which a plurality of optical fibers are disposed in parallel are assembled; and a coating for covering the periphery of the assembly in a state of having a space inside. The coating is interrupted at a part in a circumferential direction of the optical fiber unit, and an opening part is formed.

7 Claims, 4 Drawing Sheets

(56) References Cited

U.S. PATENT DOCUMENTS

| | | | | |
|---|---|---|---|---|
| 5,098,459 | A | * | 3/1992 | Fukuma ............... G02B 6/2835 385/51 |
| 5,249,249 | A | * | 9/1993 | Eoll ..................... G02B 6/4403 385/110 |
| 6,195,488 | B1 | * | 2/2001 | Song .................... G02B 6/4416 385/101 |
| 2002/0017333 | A1 | * | 2/2002 | Wellman ............. F16L 58/1009 138/146 |
| 2002/0062978 | A1 | * | 5/2002 | Sakabe ................ G02B 6/4422 174/115 |
| 2002/0173575 | A1 | * | 11/2002 | Artz ......................... B28B 7/46 524/451 |
| 2002/0197031 | A1 | * | 12/2002 | Nechitailo ............. G02B 6/441 385/112 |
| 2004/0146255 | A1 | * | 7/2004 | Ishikawa ............. G02B 6/4403 385/114 |
| 2005/0201697 | A1 | * | 9/2005 | Tanaka ................ G02B 6/4436 385/114 |
| 2007/0142893 | A1 | * | 6/2007 | Buiser ............... A61B 17/12022 623/1.11 |
| 2011/0110635 | A1 | * | 5/2011 | Toge ...................... G02B 6/441 385/102 |
| 2013/0028563 | A1 | * | 1/2013 | Matsuzawa .......... G02B 6/4482 385/120 |
| 2013/0084047 | A1 | * | 4/2013 | Baucom ............... G02B 6/4404 385/114 |
| 2017/0285285 | A1 | * | 10/2017 | Hoshino .................... G02B 6/44 |
| 2018/0273427 | A1 | * | 9/2018 | Tanaka ................ G02B 6/4403 |

FOREIGN PATENT DOCUMENTS

| | | | |
|---|---|---|---|
| JP | 2007-010917 | A | 1/2007 |
| JP | 2007304348 | A | 11/2007 |
| JP | 2009109400 | A | 4/2009 |
| JP | 2009116017 | A | 5/2009 |
| JP | 2009-271301 | A | 11/2009 |
| JP | 2010243623 | A | 10/2010 |
| JP | 2010-256793 | A | 11/2010 |
| JP | 2010256793 | A | 11/2010 |
| JP | 2010276632 | A | 12/2010 |
| JP | 2011-169939 | A | 9/2011 |
| JP | 2012128236 | A | 7/2012 |
| JP | 510442682 | | 12/2012 |
| JP | 2013025028 | A | 2/2013 |
| JP | 2013097320 | A | 5/2013 |
| JP | 5272066 | B2 | 8/2013 |
| JP | 2013182094 | A | 9/2013 |
| JP | 537448482 | | 12/2013 |
| JP | 2014-016529 | A | 1/2014 |
| JP | 2014005472 | A | 1/2014 |
| JP | 2014119524 | A | 6/2014 |
| JP | 2014119635 | A | 6/2014 |
| JP | 2014170105 | A | 9/2014 |
| JP | 2014211511 | A * | 11/2014 |
| JP | 2015040990 | A | 3/2015 |
| JP | 5735399 | B2 | 6/2015 |
| JP | 5902007 | B2 | 4/2016 |
| JP | 5914057 | B2 | 5/2016 |
| JP | 2017009924 | A | 1/2017 |
| JP | 2017037214 | A | 2/2017 |
| JP | 6191343 | B2 | 9/2017 |
| JP | WO2019088255 | A1 | 11/2017 |
| JP | 6268774 | B2 | 1/2018 |
| JP | 6442161 | B2 | 12/2018 |

* cited by examiner

OPTICAL FIBER UNIT AND OPTICAL FIBER CABLE

TECHNICAL FIELD

The present disclosure relates to an optical fiber unit and an optical fiber cable.

This application claims priority to and benefit of Japanese Patent Application No. 2017-212768, filed on Nov. 2, 2017, which is hereby incorporated by reference in its entirety.

BACKGROUND ART

Patent Literature 1 discloses an optical fiber unit formed by bundling an assembly of an optical fiber and by directly winding a plurality of bundle materials in a spiral shape in a longitudinal direction, and describes that the bundle materials are bonded to each other in a part or all of the intersections where any two pieces of the plurality of bundle materials intersect each other.

CITATION LIST

Patent Literature

[Patent Literature 1] JP-A-2011-169939

SUMMARY OF INVENTION

An optical fiber unit according to an embodiment of the present disclosure includes: an assembly in which a plurality of optical fiber ribbons in which a plurality of optical fibers are disposed in parallel are assembled; and a coating for covering the periphery of the assembly in a state of having a space inside. The coating is interrupted at a part in a circumferential direction of the optical fiber unit, and an opening part is formed.

An optical fiber cable according to an embodiment of the present disclosure includes the optical fiber unit.

DESCRIPTION OF EMBODIMENTS

Technical Problem

Figure 1:
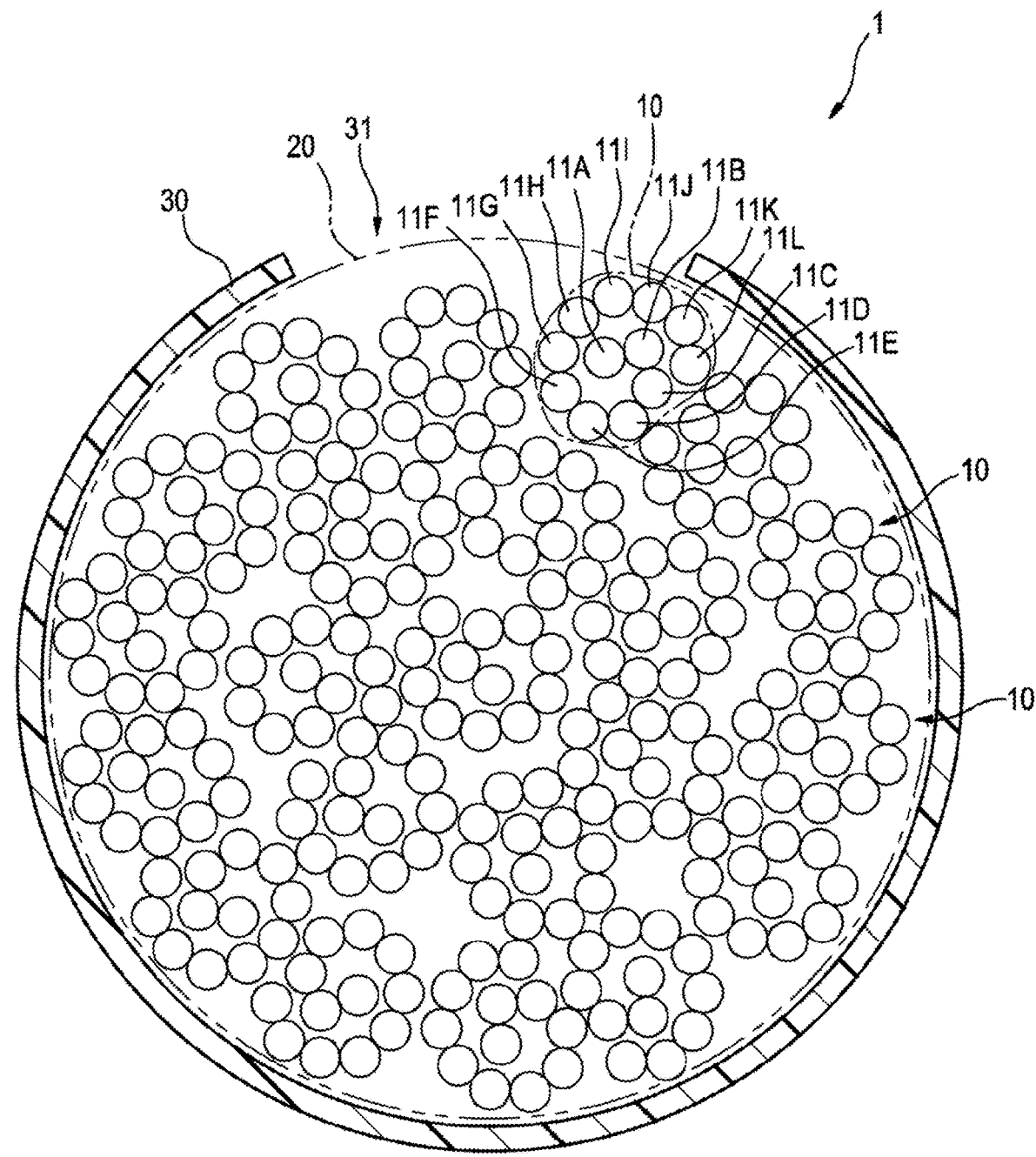
FIG. 1 is a cross-sectional view illustrating a configuration of an optical fiber unit according to an embodiment.

For example, in the optical fiber unit described in Patent Literature 1, two pieces of (a plurality of) bundle materials (or identification threads) are wound around a bundle of optical fibers (optical fiber, optical fiber ribbon) in reverse directions so as to intersect each other. The intersection of the two pieces of bundle materials is bonded.

Meanwhile, in the optical fiber unit in which two pieces of bundle materials are wound as described above, when the bonded intersection is peeled off and the internal optical fiber is taken out, there is a possibility that the bundle material may be accidentally tightened and the internal optical fiber may be damaged. When an optical fiber unit having high density is mounted on the optical cable and when a side pressure is applied to the optical fiber unit, the bundle material bites into the optical fiber and is easily connected to microbend loss.

An object of the present disclosure is to provide an optical fiber unit and an optical fiber cable in which an internal optical fiber can be easily taken out without being damaged.

Advantageous Effects of Present Disclosure

According to an optical fiber unit and an optical fiber cable of the present disclosure, an internal optical fiber can be easily taken out without being damaged.

Description of Embodiments of Present Disclosure

First, embodiments of the present disclosure will be described.

(1) An optical fiber unit according to an embodiment of the present disclosure includes: an assembly in which a plurality of optical fiber ribbons in which a plurality of optical fibers are disposed in parallel are assembled; and a coating for covering the periphery of the assembly in a state of having a space inside. The coating is interrupted at a part in a circumferential direction of the optical fiber unit, and an opening part is formed.

According to the configuration, the coating of the optical fiber unit is interrupted at a part in the circumferential direction of the optical fiber unit, and the opening part is formed. Since the opening part is provided, the internal optical fiber is easily taken out, and since the optical fiber unit is not tightened when the internal optical fiber is taken out, the internal optical fiber can be easily taken out without being damaged.

(2) The optical fiber ribbon may be an intermittently connected optical fiber ribbon in which a connection part in which adjacent optical fibers are connected to each other and a non-connection part in which adjacent optical fibers are not connected to each other are intermittently provided in a longitudinal direction between some or all of the optical fibers.

According to the configuration, since the optical fiber ribbon is intermittently connected, the optical fiber ribbon can be assembled to form the assembly so that a gap between the assemblies is reduced, and the assembly can be easily formed with high density.

(3) The opening part may be formed in a spiral shape along the longitudinal direction of the optical fiber unit.

According to the configuration, since the opening part is formed in a spiral shape with respect to a direction in which the optical fiber is inserted, it is possible to prevent the optical fiber from unexpectedly jumping out when the optical fiber unit is bent.

(4) Young's modulus of the coating may be 400 MPa or less.

According to the configuration, since the Young's modulus of the coating is 400 MPa or less, an outer shape of the optical fiber unit can be easily deformed. Accordingly, the outer shape of the optical fiber unit can be deformed and mounted on the optical fiber cable with high density.

(5) More than half in the circumferential direction of the optical fiber unit may be covered with the coating.

According to the configuration, since more than half in the circumferential direction of the optical fiber unit is covered with the coating, it is possible not only to prevent the optical fiber from jumping out easily from the inside, but also to prevent the optical fiber from being damaged.

(6) The opening part may be intermittently provided in the longitudinal direction of the optical fiber unit.

According to the configuration, since the opening part is intermittently provided in the longitudinal direction of the optical fiber unit, the optical fiber in the optical fiber unit is further hard to jump out.

(7) A bundle wound around the coating may be provided.

According to the configuration, since the bundle is wound around the coating, the optical fiber can be further surely prevented from jumping out.

(8) An optical fiber cable according to an embodiment of the present disclosure includes the optical fiber unit according to any one of claims 1 to 7.

According to the configuration, when the optical fiber cable is disassembled and the optical fiber is taken out from the optical fiber unit, the optical fiber unit is not tightened and the optical fiber can be easily taken out without being damaged.

Details of Embodiments of Present Disclosure

Specific examples of an optical fiber unit and an optical fiber cable according to embodiments of the present disclosure will be described hereinafter with reference to the drawings.

The present disclosure is not limited to the following examples and is intended to include meanings equivalent to the scope of the claims described in the scope of the claims and all the modifications within the scope.

Figure 2:
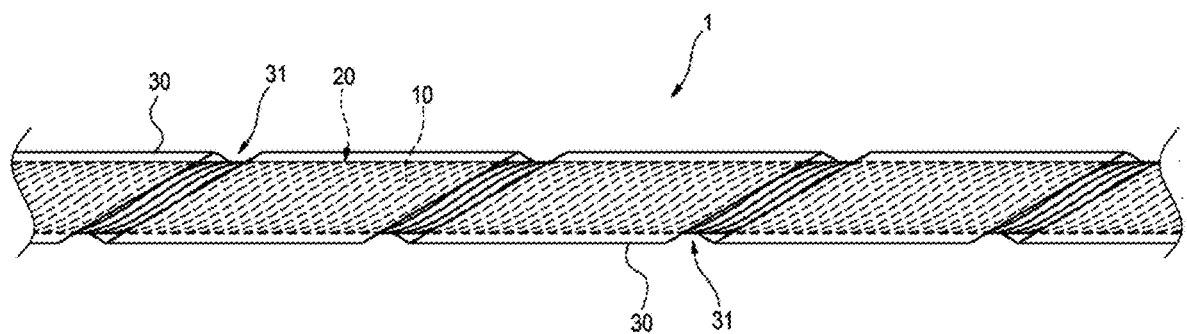
FIG. 2 is a schematic view illustrating a configuration in a longitudinal direction of the optical fiber unit according to the embodiment.

FIGS. 1 and 2 illustrate an example of an optical fiber unit according to an embodiment. FIG. 1 is a cross-sectional view perpendicular to a longitudinal direction of an optical fiber unit 1. FIG. 2 is a plan view in the longitudinal direction of the optical fiber unit 1.

As illustrated in FIG. 1, the optical fiber unit 1 includes an assembly 20 in which a plurality of optical fiber ribbons 10 are assembled and a coating 30 for covering the periphery of the assembly 20.

In the optical fiber ribbon 10, a plurality (12 pieces in this example) of optical fibers 11 (11A to 11L) are connected to each other by a resin in a parallel state where at least some parts thereof are in contact with each other. Although not illustrated, each of the optical fibers 11A to 11L is formed of, for example, a glass fiber formed of a core and a clad and a coating layer for covering the glass fiber.

In this example, the optical fiber ribbon 10 assembled as the assembly 20 is formed into a assembled form in which a plurality of optical fibers 11A to 11L are assembled (for example, assembled in a round shape) in a cross-sectional view so that a length in an arrangement direction is shorter than that of a case where 12 pieces of the optical fibers 11A to 11L are arranged in a line. For example, the optical fiber ribbons 10 may be twisted in a spiral shape to form the assembly 20 or may be assembled without being twisted to form the assembly 20.

The coating 30 is provided so as to cover the periphery of the assembly 20 in which the plurality of optical fiber ribbons 10 are assembled in a hollow state. The "hollow state" indicates a state in which the periphery of the assembly 20 is covered with a thin layer-shaped covering member and a hollow portion exists inside the covering member. The plurality of optical fiber ribbons 10 are housed inside the layer-shaped coating 30 in the hollow state.

The coating 30 has, for example, Young's modulus of 400 MPa or less. Therefore, the optical fiber unit 1 including the coating 30 is formed in a state where a shape thereof can be elastically deformed. The coating 30 is formed of a thermoplastic resin and an ultraviolet curing resin. For example, the coating 30 can be formed of a plastic material such as elastomer and low-density polyethylene (LDPE). A thickness of the coating 30 is desirably 0.5 mm or less.

As illustrated in FIG. 1, the covering 30 is formed so that an outer shape of a cross section thereof is, for example, a circular shape. The coating 30 can be formed by, for example, extrusion coating. An opening part 31 is formed in the coating 30 by interrupting a part in a circumferential direction. The opening part 31 is formed so that a size thereof is smaller than half in the circumferential direction of the optical fiber unit 1. That is, more than half in the circumferential direction of the optical fiber unit 1 is formed to be covered with the coating 30.

As illustrated in FIG. 2, it is desirable that the opening part 31 is formed in a spiral shape along the longitudinal direction of the optical fiber unit 1. In this example, a direction in the spiral shape of the opening part 31 is the same direction as a twisting direction in the spiral shape of the optical fiber ribbons 10 housed inside the coating 30. The directions in the spiral shape of both may be reversed.

For example, the opening part 31 can be formed in the spiral shape by rotating a C-shaped die when performing the extrusion coating of the coating 30. After the whole circumference of the coating 30 of the optical fiber unit 1 is covered by the extrusion coating, the opening part 31 may be formed by making a cut in the coating 30.

While the opening part 31 in this example is continuously formed along the longitudinal direction of the optical fiber unit 1, the opening part 31 may be provided intermittently, for example in a perforation shape. The opening part 31 is not limited to the spiral shape, but may be formed, for example, in a linear shape along the longitudinal direction.

A bundle material (not illustrated) formed of a tape or a thread such as, for example, polyethylene terephthalate may be provided around the coating 30 of the optical fiber unit 1. The bundle material is wound around the coating 30 in a spiral shape. It is desirable that a spiral-shaped direction in which the bundle material is wound is opposite to the direction in the spiral shape of the opening part 31.

Figure 3:
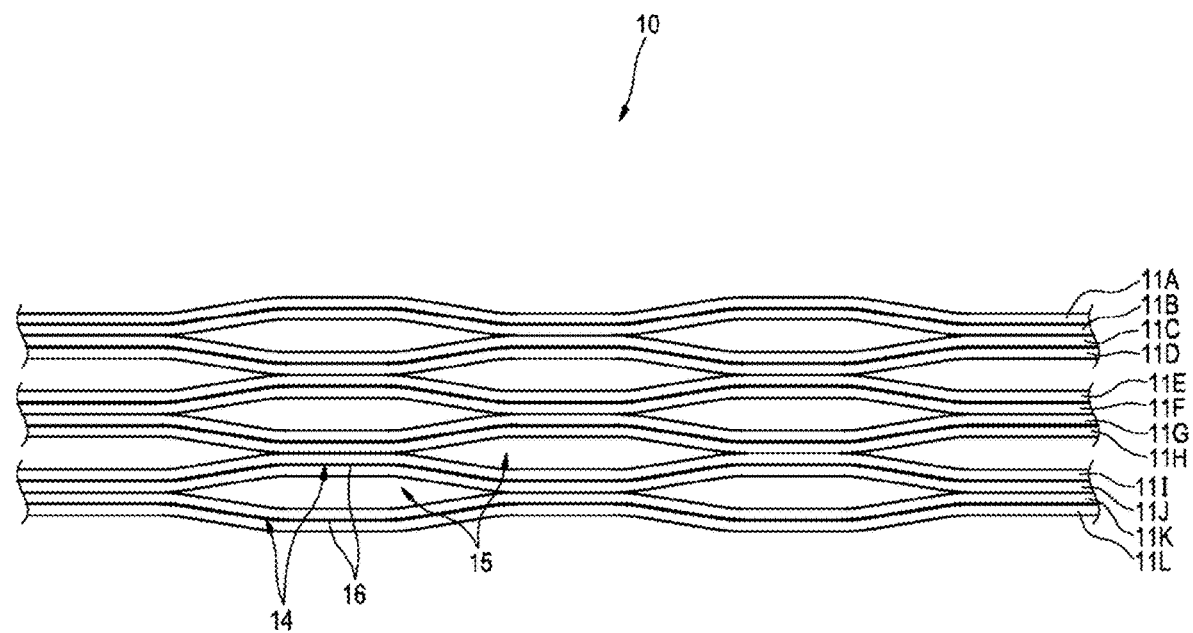
FIG. 3 is a plan view illustrating an example of an optical fiber ribbon that is housed in a coating of the optical fiber unit according to the embodiment.

FIG. 3 illustrates an example of the optical fiber ribbon 10 housed inside the coating 30 of the optical fiber unit 1. The optical fiber ribbon 10 is an intermittently connected optical fiber ribbon in which a connection part 14 in which adjacent optical fibers are connected to each other and a non-connection part 15 in which adjacent optical fibers are not connected to each other are intermittently provided in the longitudinal direction in a state where the plurality of optical fibers are disposed in parallel.

In the optical fiber ribbon 10 in this example, 12 pieces of the optical fibers 11A to 11L are disposed in parallel. FIG. 3 illustrates an intermittently connected optical fiber ribbon in a state where the optical fibers 11A to 11L are opened in an arrangement direction. A part where the connection part 14 and the non-connection part 15 are intermittently provided may be provided between some optical fibers as illustrated in FIG. 3 or may be provided between all the optical fibers. In the example illustrated in FIG. 3, the non-connection part 15 is not provided between the optical fibers 11A and 11B, 11C and 11D, 11E and 11F, 11G and 11H, 11I and 11J, and 11K and 11L.

The connection part 14 in the optical fiber ribbon 10 is formed by applying, for example, a connection resin 16 made of an ultraviolet curable resin and a thermosetting resin between the optical fibers. By applying the connection resin 16 between the predetermined optical fibers, the connection part 14 and the non-connection part 15 are intermittently provided, and the respective optical fibers 11A to 11L are integrated in a parallel state. The connection resin 16 may be applied to only one surface of a parallel surface to be formed with the optical fibers 11A to 11L disposed in parallel or may be applied to both surfaces thereof. An optical fiber ribbon including a configuration in which the non-connection part 15 is not formed may be also used. The optical fiber ribbon 10 may be manufactured, for example, in such a manner that the connection resin 16 is applied to one surface or both surfaces of the optical fibers 11A to 11L disposed in parallel, all the optical fibers 11A to 11L are connected, and the non-connection part 15 is formed by cutting a part with a rotary blade.

According to the optical fiber unit 1 including such a configuration, since a part of the circumferential direction is interrupted to form the opening part 31, the coating 30 can be cut open with the opening part 31 as a starting point when the internal optical fiber 11 is taken out. The optical fiber unit 1 is not tightened when the internal optical fiber 11 is taken out. Therefore, the optical fiber 11 can be easily taken out from the cut opened opening part 31 and can be taken out without being damaged.

Figure 4:
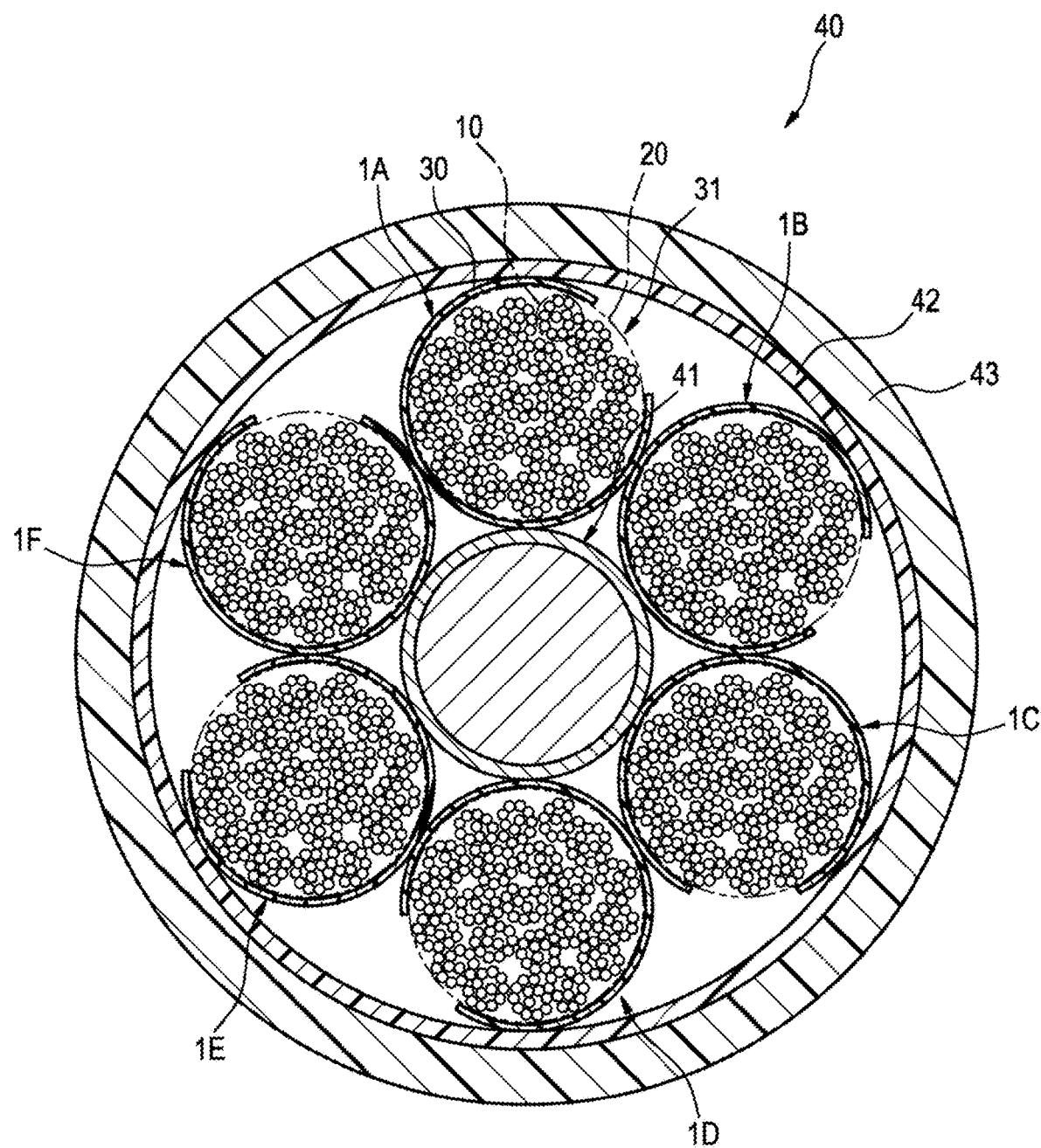
FIG. 4 is a cross-sectional view illustrating an example of an optical fiber cable in which the optical fiber unit according to the embodiment is housed.

FIG. 4 illustrates an example of an optical fiber cable in which the above-described optical fiber unit 1 is housed. As illustrated in FIG. 4, an optical fiber cable 40 includes a tension member 41 disposed in a center part and a plurality (6 pieces in this example) of optical fiber units 1 (1A to 1F) disposed around the tension member 41. The optical fiber cable 40 includes a waterproof tape 42 for covering the peripheries of the optical fiber units 1A to 1F, and a jacket 43 for covering the periphery of the waterproof tape 42. The jacket 43 is formed of a relatively hard material.

The optical fiber units 1A to 1F in this example are disposed along the longitudinal direction around the tension member 41 without the optical fiber units being twisted. The optical fiber units may be twisted, and when the optical fiber units are twisted, the respective optical fiber units 1A to 1F are disposed around the tension member 41 in a state where respective outer shapes thereof are deformed.

According to the optical fiber cable 40 including such a configuration, since the optical fiber unit 1 is used, a tightening force applied to the optical fiber 11 can be relaxed when the optical fiber cable 40 is disassembled and the optical fiber 11 is taken out from the optical fiber unit 1. Therefore, the optical fiber 11 can be easily taken out without being damaged.

Figure 5:
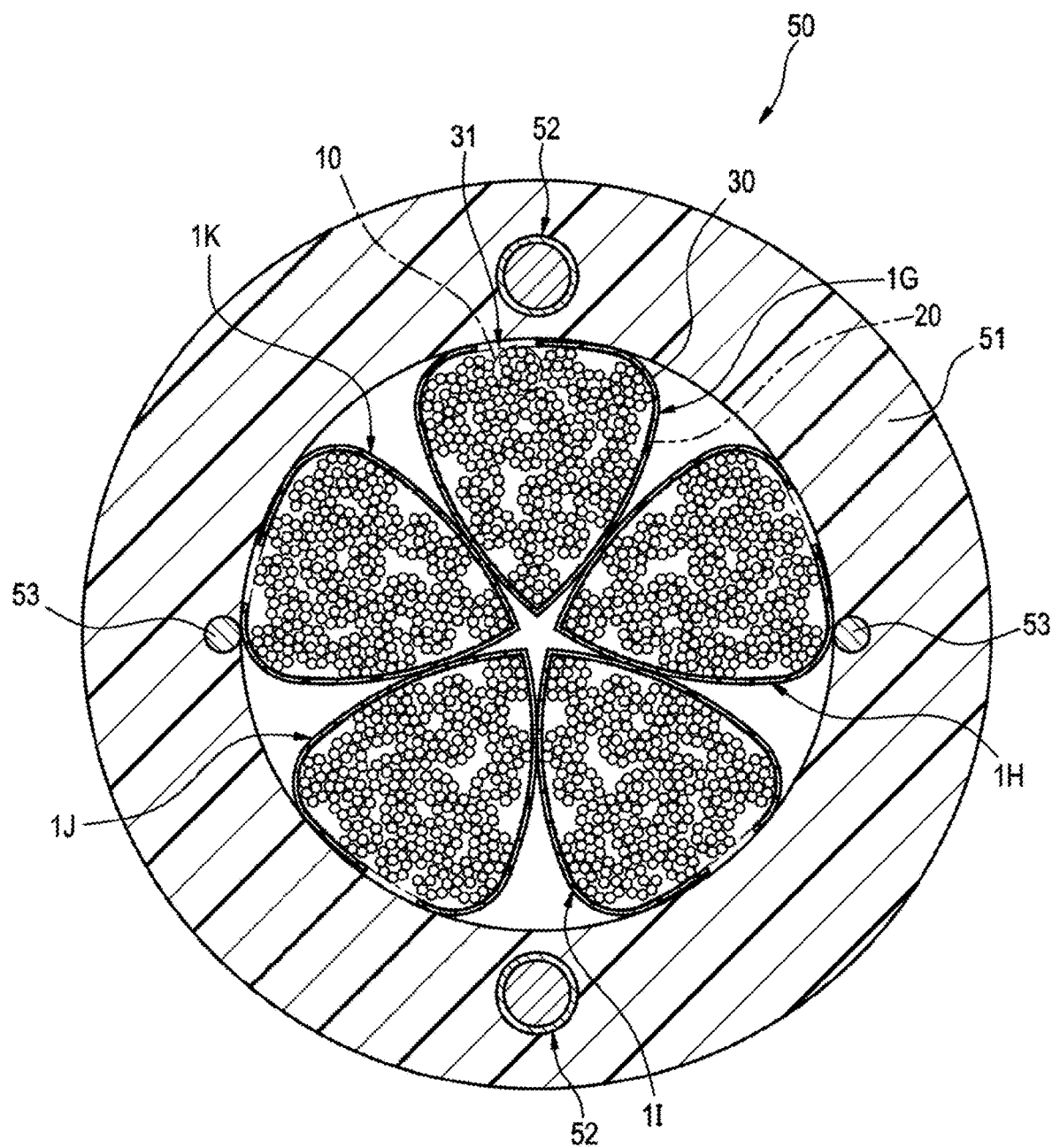
FIG. 5 is a cross-sectional view illustrating another example of the optical fiber cable in which the optical fiber unit according to the embodiment is housed.

FIG. 5 illustrates another example of the optical fiber cable in which the above-described optical fiber unit 1 is housed. As illustrated in FIG. 5, an optical fiber cable 50 includes a plurality of (5 pieces in this example) optical fiber units 1 (1G to 1K) and a jacket 51 for covering the periphery of the optical fiber units 1G to 1K. A tension member 52 is embedded in the jacket 51. The jacket 51 may be provided with a tear string 53 for tearing the jacket 51 when performing intermediate splitting. The optical fiber cable 50 is configured to be easily deformed by using a soft material for the jacket 51 in order to mount the optical fibers with higher density.

The optical fiber units 1G to 1K in this example are housed inside the jacket 51 by twisting the optical fiber units. Therefore, the respective optical fiber units 1G to 1K are housed in a state where respective outer shapes thereof are deformed.

According to the optical fiber cable 50 including such a configuration, the same effect as that of the optical fiber cable 40 is obtained.

As described above, while the present disclosure is described in detail or with reference to specific embodiments, it is apparent to those skilled in the art that various modifications and corrections can be made without departing from the spirit and scope of the present disclosure. Further, the number, position, and shape of the component members described above are not limited to the embodiments, and can be changed to the number, position, and shape suitable for performing the present disclosure.

REFERENCE SIGNS LIST 1 (1A to 1F): optical fiber unit
10: optical fiber ribbon
11 (11A to 11L): optical fiber
14: connection part
15: non-connection part
16: connection resin
20: assembly
30: coating
31: opening part
40, 50: optical fiber cable
43, 51: jacket

The invention claimed is:

1. An optical fiber unit, comprising:
an assembly in which a plurality of optical fiber ribbons in which a plurality of optical fibers are disposed in parallel are assembled; and
a coating for covering the periphery of the assembly in a state of having a space inside, wherein
Young's modulus of the coating is 400 MPa or less, and
the coating is interrupted at a part in a circumferential direction of the optical fiber unit, and an opening part is formed.

2. The optical fiber unit according to claim 1, wherein
the optical fiber ribbon is an intermittently connected optical fiber ribbon in which a connection part in which adjacent optical fibers are connected to each other and a non-connection part in which adjacent optical fibers are not connected to each other are intermittently provided in a longitudinal direction between some or all of the optical fibers.

3. The optical fiber unit according to claim 1, wherein
the opening part is formed in a spiral shape along the longitudinal direction of the optical fiber unit.

4. The optical fiber unit according to claim 1, wherein
more than half in the circumferential direction of the optical fiber unit is covered with the coating.

5. The optical fiber unit according to claim 1, wherein
the opening part is intermittently provided in the longitudinal direction of the optical fiber unit.

6. An optical fiber cable, comprising:
the optical fiber unit according to claim 1.

7. An optical fiber unit, comprising:
an assembly in which a plurality of optical fiber ribbons in which a plurality of optical fibers are disposed in parallel are assembled;
a coating for covering the periphery of the assembly in a state of having a space inside; and a bundle wound around the coating, wherein
the coating is interrupted at a part in a circumferential direction of the optical fiber unit, and an opening part is formed.

* * * * *